(12) United States Patent
Bamba

(10) Patent No.: US 6,356,562 B1
(45) Date of Patent: Mar. 12, 2002

(54) HIGH-SPEED COMMUNICATIONS SYSTEM FOR PROVIDING VOICE AND DATA SERVICES

(75) Inventor: Masakazu Bamba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/216,497

(22) Filed: Dec. 18, 1998

(30) Foreign Application Priority Data

Jun. 11, 1998 (JP) .......................................... 10-163077

(51) Int. Cl.[7] .............................. H04J 1/00; H04J 3/16; H04J 3/02; H04L 5/14; H04M 11/00
(52) U.S. Cl. ....................... 370/463; 370/217; 370/295; 370/465; 370/540; 370/493; 370/533; 379/90.01; 379/93.08
(58) Field of Search ................................ 370/463, 465, 370/468, 477, 488, 494, 495, 295, 281, 282, 540, 543; 379/90.01, 93.08, 399, 398

(56) References Cited

U.S. PATENT DOCUMENTS

| | | | | |
|---|---|---|---|---|
| 5,471,517 A | * | 11/1995 | Nakagawa | 379/29 |
| 5,889,856 A | * | 3/1999 | O'Toole et al. | 379/399 |
| 5,930,340 A | * | 7/1999 | Bell | 379/93.08 |
| 6,005,873 A | * | 12/1999 | Amit | 370/494 |
| 6,069,879 A | * | 5/2000 | Chatter | 370/295 |
| 6,167,034 A | * | 12/2000 | Langberg et al. | 370/281 |

* cited by examiner

Primary Examiner—Ricky Ngo
Assistant Examiner—M. Phan
(74) Attorney, Agent, or Firm—Roseman & Colin LLP

(57) ABSTRACT

A high-speed communications system which permits high-speed communication services to be implemented with minimum modification to the existing communications facilities. A multiplexer/demultiplexer unit multiplexes outgoing signals to a network and demultiplexes incoming signals from the network separately for voice and data signals. A first voice processing unit, being linked to a voice service subscriber who only uses voice communication services, processes voice signals for bidirectional communications over a subscriber line. A second voice processing unit, being linked to a voice/data service subscriber who uses both voice and data communication services, processes voice signals for bidirectional communication. An office-side modem unit has modulator/demodulator functions to support high-speed bidirectional data communication for the voice/data service subscriber. An office-side splitter splits incoming signals from the voice/data service subscriber into separate voice and data signals. A subscriber-side splitter, coupled to the office-side splitter through the subscriber line, separates the voice signals and the data signals. A subscriber-side modem unit processes data signals to support high-speed bidirectional data communication.

12 Claims, 12 Drawing Sheets

| NAME | FEATURES |
|---|---|
| IDSL (I : ISDN) | SINGLE-PAIR CABLE, ISDN BASIC RATE (2B+D) |
| HDSL (H : High bit-rate) | DUAL-PAIR CABLE, 1.5-2 MBPS, SYMMETRIC |
| SDSL (S : Symmetric) | SINGLE-PAIR CABLE, 1.5-2 MBPS, SYMMETRIC |
| ADSL (A : Asymmetric) | SINGLE-PAIR CABLE, UPSTREAM 1 MBPS (MAX) + DOWNSTREAM 8 MBPS (MAX), ASYMMETRIC |
| VDSL (V : Very high bit-rate) | SINGLE-PAIR CABLE, UPSTREAM 2-3 MBPS (MAX) + DOWNSTREAM 52 MBPS (MAX), ASYMMETRIC |

HIGH-SPEED COMMUNICATIONS SYSTEM FOR PROVIDING VOICE AND DATA SERVICES

BACKGROUND OF THE INVENTION

1. Field of the Invention

The present invention relates to a high-speed communications system including a subscriber line transmission unit and a subscriber station, and also to a method of configuring communications facilities for high-speed services. More particularly, the present invention relates to a high-speed communications system which provides subscribers with high-speed voice/data communication services over standard telephone lines, and to a method of configuring transmission equipment for high-speed voice/data communication services.

2. Description of the Related Art

To meet the increasingly high demand for fast (e.g., from several hundred kbps to several Mbps) and inexpensive remote access, some new technologies have been introduced in recent years. The most promising of these technologies is the Digital Subscriber Line (DSL). The xDSL is a kind of modem technology which allows high-speed data transmission of several Mbps over ubiquitous, copper-wire telephone wiring infrastructure. Unlike the other existing standards such as V.34, the xDSL utilizes higher frequencies above 4 kHz, which is the upper limit of a frequency band for plain voice communications. Actually, some of the xDSL technologies use a high frequency range from several kHz to 1 MHz.

There are a few versions of xDSL technologies, targeting different data rates and transmission distances. Asymmetric DSL (ADSL) is the most popular specifications among the xDSL family technologies. To make ADSL services available, local carriers have to deploy ADSL modems and splitters in their central offices, and the users (or subscribers) should place similar equipment at their sites. They can enjoy Internet access with enhanced performance of their new communications environment that offers 8 Mbps (max) for downstream and 1 Mbps (max) for upstream data transmission, without changing their old telephone sets or replacing the telephone lines (or subscriber loops) that reach them. As such, the xDSL is a low-cost solution for high-speed network communication with the maximum utilization of existing telecommunications infrastructure.

In actual implementations of xDSL services, however, it is necessary for local carriers to upgrade existing telecommunications equipment at their central offices by installing some new components, such as ADSL modems and splitters. That is, more and more xDSL components should be installed, as the number of requesting users increases. Local carriers would face difficulties in their operations since the above upgrade requires more floor space to accommodate new components and needs more engineering work for cabling to interconnect them.

SUMMARY OF THE INVENTION

Taking the above into consideration, a first object of the present invention is to provide a high-speed communications system which permits high-speed communication services to be readily implemented with minimum modification to the existing communications facilities.

Also, a second object of the present invention is to provide a subscriber line transmission unit which permits high-speed communication services to be implemented with minimum modification to the existing communications facilities.

Further, a third object of the present invention is to provide a subscriber station which offers high-speed communication services.

Moreover, a fourth object of the present invention is to provide a method of enabling high-speed services with minimum modification to existing communications facilities.

To accomplish the above objects, according to the present invention, there is provided a high-speed communications system which provides high-speed communication services over subscriber lines. This system comprises the following elements:

(a) a subscriber line transmission unit located in a central office, comprising:
  (a1) a multiplexer/demultiplexer unit which multiplexes outgoing signals to a network and demultiplexes incoming signals from the network, separately for voice signals and data signals,
  (a2) a first voice processing unit, linked to a voice service subscriber who only uses voice communication services, which processes the voice signals for bidirectional communications over the subscriber line,
  (a3) a second voice processing unit, linked to a voice/data service subscriber who uses both voice and data communication services, which processes the voice signals for bidirectional communication, and
  (a4) a high-speed communications control unit comprising:
    (a4-1) an office-side modem unit for processing the data signals to provide the voice/data service subscriber with bidirectional communication services, and
    (a4-2) an office-side splitter unit for separating the voice signals and the data signals when providing the voice/data service subscriber with bidirectional communication services;
(b) a subscriber station disposed at a site of the voice/data service subscriber, comprising:
  (b1) a subscriber-side splitter unit, coupled to the office-side splitter unit through the subscriber line, for separating the voice signals and the data signals, and
  (b2) a subscriber-side modem unit for processing the data signals to provide the voice/data service subscriber with bidirectional communication services.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 8 is a table which briefly describes the features of office-side modems;

DESCRIPTION OF THE PREFERRED EMBODIMENTS

An embodiment of the present invention will be described below with reference to the accompanying drawings.

Figure 1:
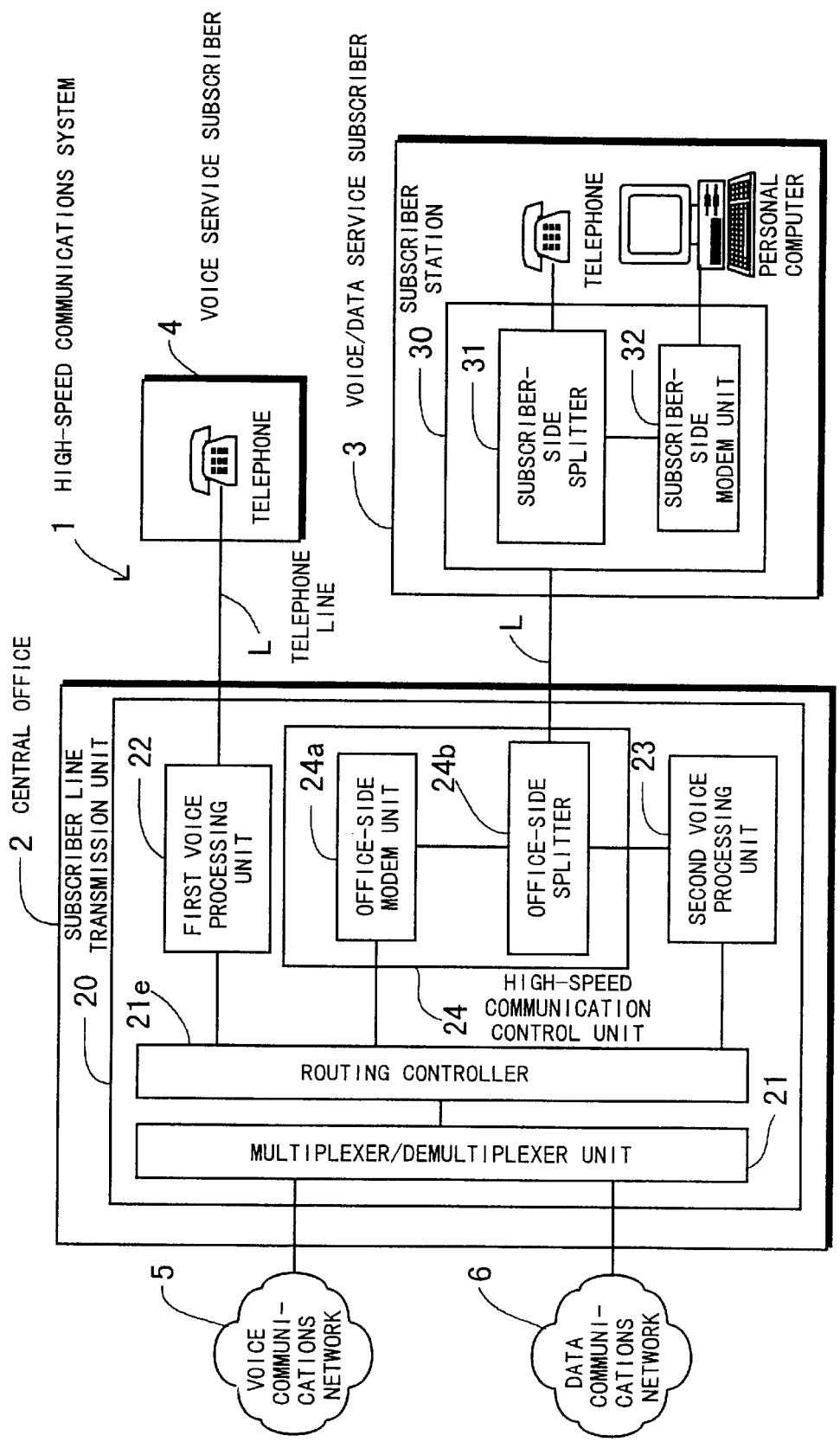
FIG. 1 is a conceptual view of a high-speed communications system according to the present invention.

FIG. 1 is a conceptual view of a high-speed communications system according to the present invention. This high-speed communications system 1 is organized by the following entities:

a voice communications network 5 such as a public switch telephone network, a data communications network 6 such as the Internet, a central office 2 comprising a subscriber line transmission unit 20, which is operated by a high-speed communication service provider, a voice service subscriber 4 who uses ordinary voice communication services, and a voice/data service subscriber 3 who uses both voice and data communication services through a subscriber station 30.

The above high-speed communications system 1 uses xDSL technologies to provide the voice/data service subscriber 3 with high speed access to the central office 2 through a subscriber line, or telephone line L. Via another telephone line L, the central office 2 is linked with the voice service subscriber 4, a user of ordinary voice communication services.

The subscriber line transmission unit 20 comprises several functional elements as described below. A multiplexer/demultiplexer unit 21 sends and receives multiplexed signals to/from the voice communications network 5 and data communications network 6. More specifically, the multiplexer/demultiplexer unit 21 performs the following processes: multiplexing of outgoing voice signals to the voice communications network 5, demultiplexing of incoming voice signals from the voice communications network 5, multiplexing of outgoing data signals to the data communications network 6, and demultiplexing of incoming data signals from the data communications network 6. Although not shown in FIG. 1, a switching system is disposed between the voice communications network 5 and the multiplexer/demultiplexer unit 21.

A first voice processing unit 22 is linked to the voice service subscriber 4, a user of ordinary voice communication services, to transmit and receive voice signals over a telephone line L. This first voice processing unit 22 performs signal processing for bidirectional voice communication, which actually includes analog-to-digital (A/D) conversion and digital-to-analog (D/A) conversion. Similar to this first voice processing unit 22, a second voice processing unit 23 performs signal processing for bidirectional voice communication. It transmits and receives voice traffic to/from the voice/data service subscriber 3, who uses both voice and data services.

A high-speed communication control unit 24 comprises an office-side modem unit 24a and an office-side splitter 24b. The office-side modem unit 24a provides a modulator/demodulator (modem) function to support high-speed bidirectional data communication with the voice/data service subscriber 3. The type of this modem function depends on what kind of digital subscriber loop is implemented in the system. Suppose, for example, that the ADSL technology is used to offer high-speed services. In this case, the office-side modem unit 24a is a high-speed ADSL modem, which provides an upstream data rate of 16 kbps to 1 Mbps and a downstream data rate of 1.5 Mbps to 8 Mbps. Here, the term "upstream" denotes the direction from the voice/data service subscriber 3 to the central office 2, and the term "downstream" the reverse direction.

During a session of bidirectional communication with the voice/data service subscriber 3, the office-side splitter 24b splits the reception signals into voice signals and data signals. Note here that the term "splitting" refers to demultiplexing reception signals in the frequency domain and outputting separate signal streams. More specifically, the splitter 24b outputs voice signals (or low-frequency signals) to its low-frequency output port and data signals (or high-frequency signals) to its high-frequency output port.

On the subscriber's side of the present system 1, the subscriber station 30 comprises a subscriber-side splitter 31 and a subscriber-side modem unit 32. The subscriber-side splitter 31, being linked to the splitter 24b in the central office 2 via the telephone line L, provides signal splitting functions to demultiplex voice and data. The voice signals are supplied to a telephone set that the subscriber 3 uses, while the data signals are supplied to a personal computer via the subscriber-side modem unit 32. The subscriber-side modem unit 32 has the same function as the above-described office-side modem unit 24a to support high-speed bidirectional data communication.

In the subscriber line transmission unit 20, the first voice processing unit 22 operates for voice communication services, independently of the second voice processing unit 23 and the high-speed communication control unit 24, which are working for voice/data communication services. Although FIG. 1 illustrates only one set of first voice processor 22, second voice processor 23 and high-speed communication control unit 24, the subscriber line transmission unit 20 actually contains many such functional units to interface with a plurality of service subscribers. That is, the subscriber line transmission unit 20 has as many first voice processing units 22 as the number of voice service subscribers 4, and as many sets of the second voice processing unit 23 and high-speed communication control unit 24 as the number of voice/data service subscribers 3. The first voice processing unit 22, however, may not be necessary, when the subscriber line transmission unit 20 is dedicated to the voice/data service subscribers 3. The detailed installation of those functional units will be presented in later sections, with reference to FIG. 10.

In addition to the above-described elements, the subscriber line transmission unit 20 comprises a routing controller 21e which controls the routing of voice and data signals sent to/from service subscribers. More specifically, the connection route of a signal originating from the network 5 or 6 is decided on the basis of its destination address that points to one of the voice service subscribers 4 and voice/data service subscribers 3. According to the decided route, the routing controller 21e delivers the signal to either the first voice processing unit 22, the second voice processing unit 23, or the high-speed communication control unit 24. The routing controller 21e may optionally be implemented as integral part of the multiplexer/demultiplexer unit 21. With this routing controller 21e, the subscriber line transmission unit 20 can distribute voice and data signals to their intended destinations (i.e., service subscribers) more efficiently, compared to conventional xDSL services.

Figure 2:
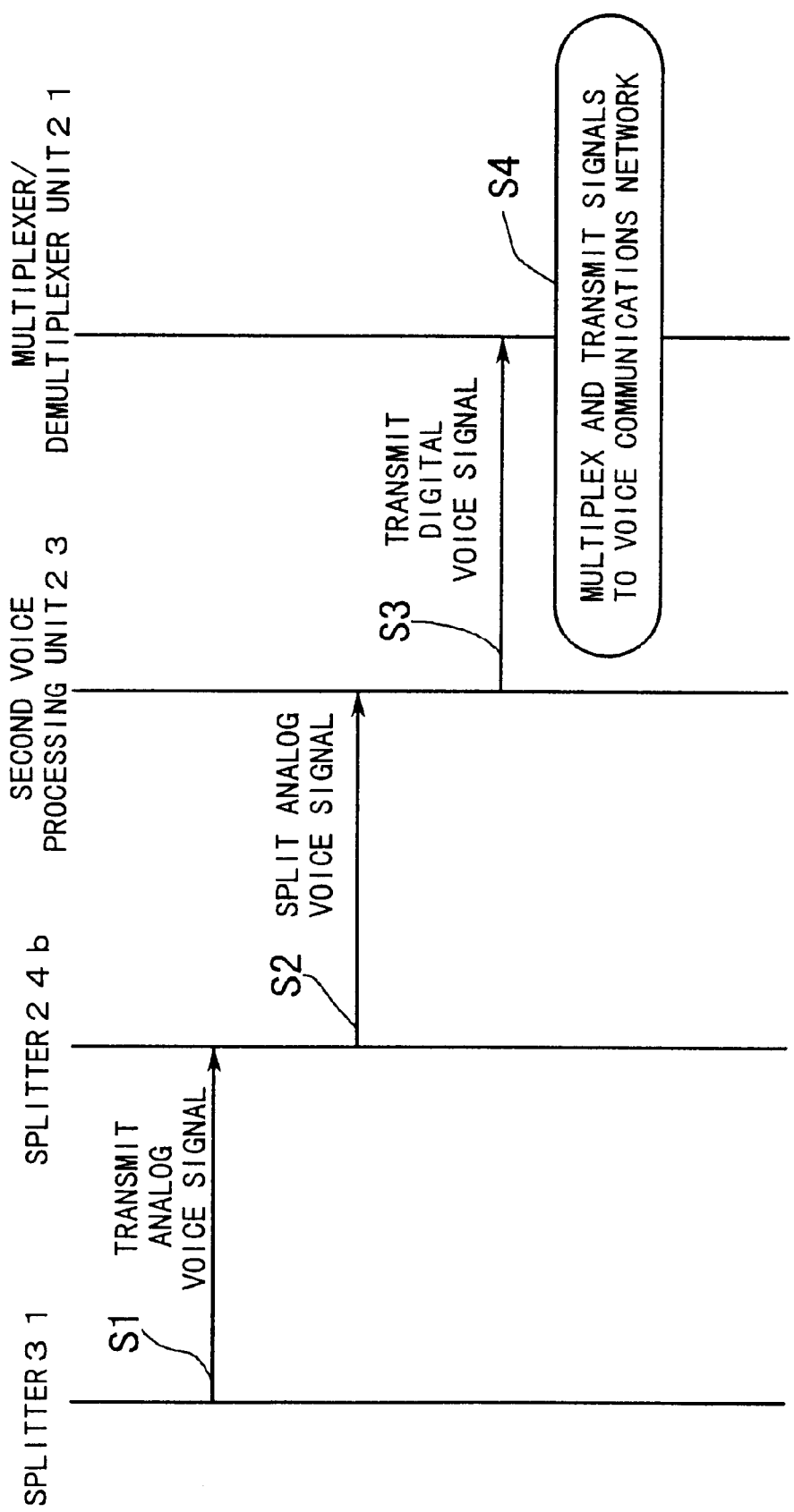
FIG. 2 is a sequence diagram which shows a process of transmitting voice signals from a subscriber station to a central office.
Figure 3:
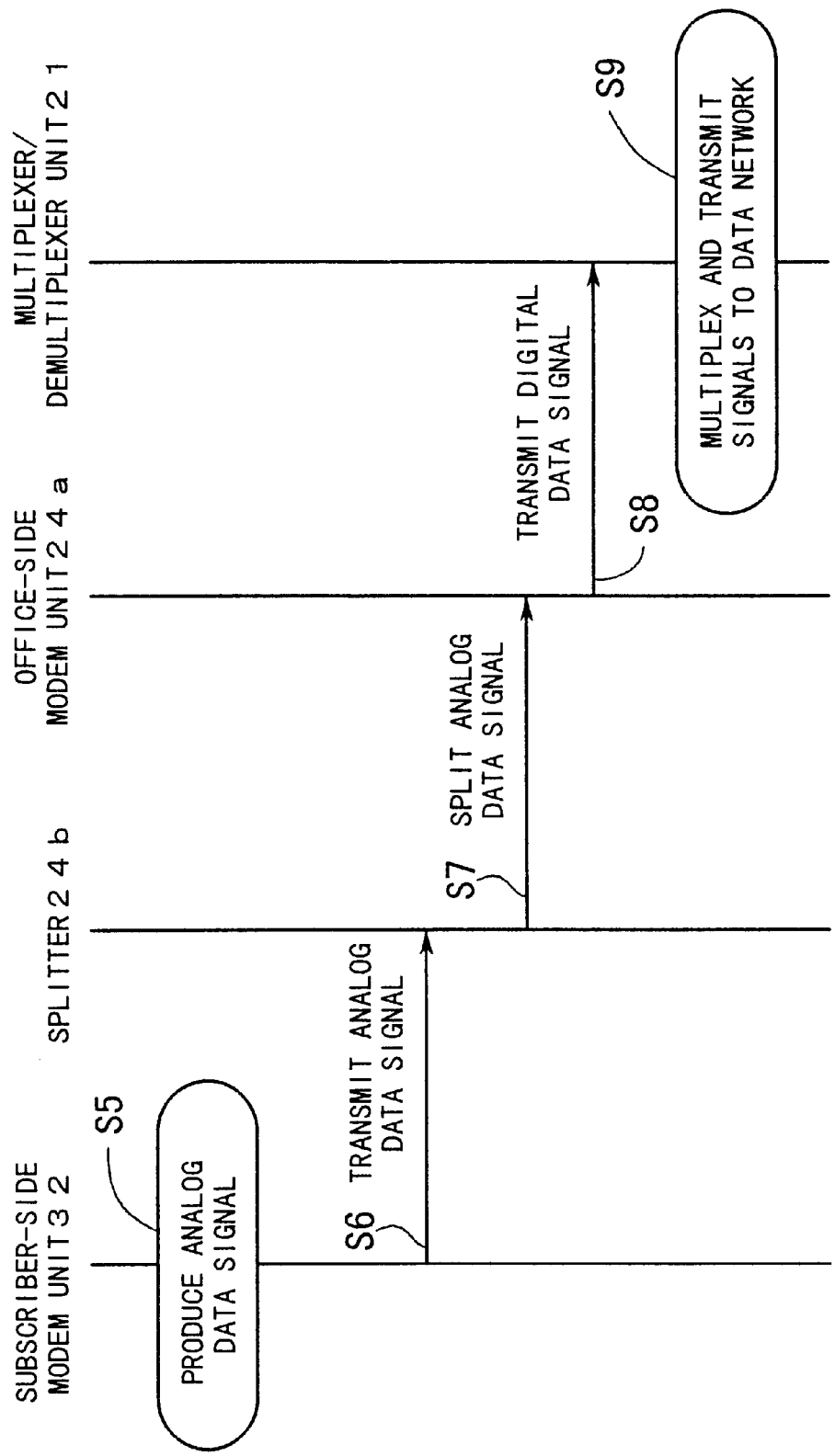
FIG. 3 is a sequence diagram which shows a process of transmitting data signals from a subscriber station to a central office.

Referring now to FIGS. 2 and 3, the following section will describe the signal traffic particularly in an upstream signal transmission from the voice/data service subscriber 3 to the central office 2. The explanation skips routing processes, assuming that the signal delivery route has already been established by the routing controller 21e.

FIG. 2 is a sequence diagram which shows a process of transmitting voice signals to the central office 2.

(S1) At the subscriber's site, the splitter 31 receives an analog voice signal from the telephone set and transmits it to the splitter 24b in the central office 2.

(S2) The splitter 24b feeds the received analog voice signal to the second voice processor 23.

(S3) The second voice processing unit 23 converts the analog voice signal into a digital voice signal and sends it to the multiplexer/demultiplexer unit 21.

(S4) The multiplexer/demultiplexer unit 21 combines the digital voice signal with other such signals received from other voice/data service subscribers and voice service subscribers. The resultant multiplexed voice signal is then transmitted to the voice communications network 5 through a switching system.

FIG. 3 is a sequence diagram which shows a process of transmitting data signals to the central office 2.

(S5) The subscriber-side modem unit 32 converts a source data signal received from the personal computer, thus producing an analog data signal.

(S6) The subscriber-side modem unit 32 then transmits the analog data signal toward the office-side splitter 24b via its local splitter 31.

(S7) The splitter 24b extracts the analog voice signal and feeds it to the office-side modem unit 24a.

(S8) The office-side modem unit 24a converts the analog data signal back to a digital data signal and sends it to t he multiplexer/demultiplexer unit 21.

(S9) The multiplexer/demultiplexer unit 21 combines the received digital data signal with other such signals received from other voice/data service subscribers. The resultant multiplexed data signal is then transmitted to the data communications network 6.

Figure 4:
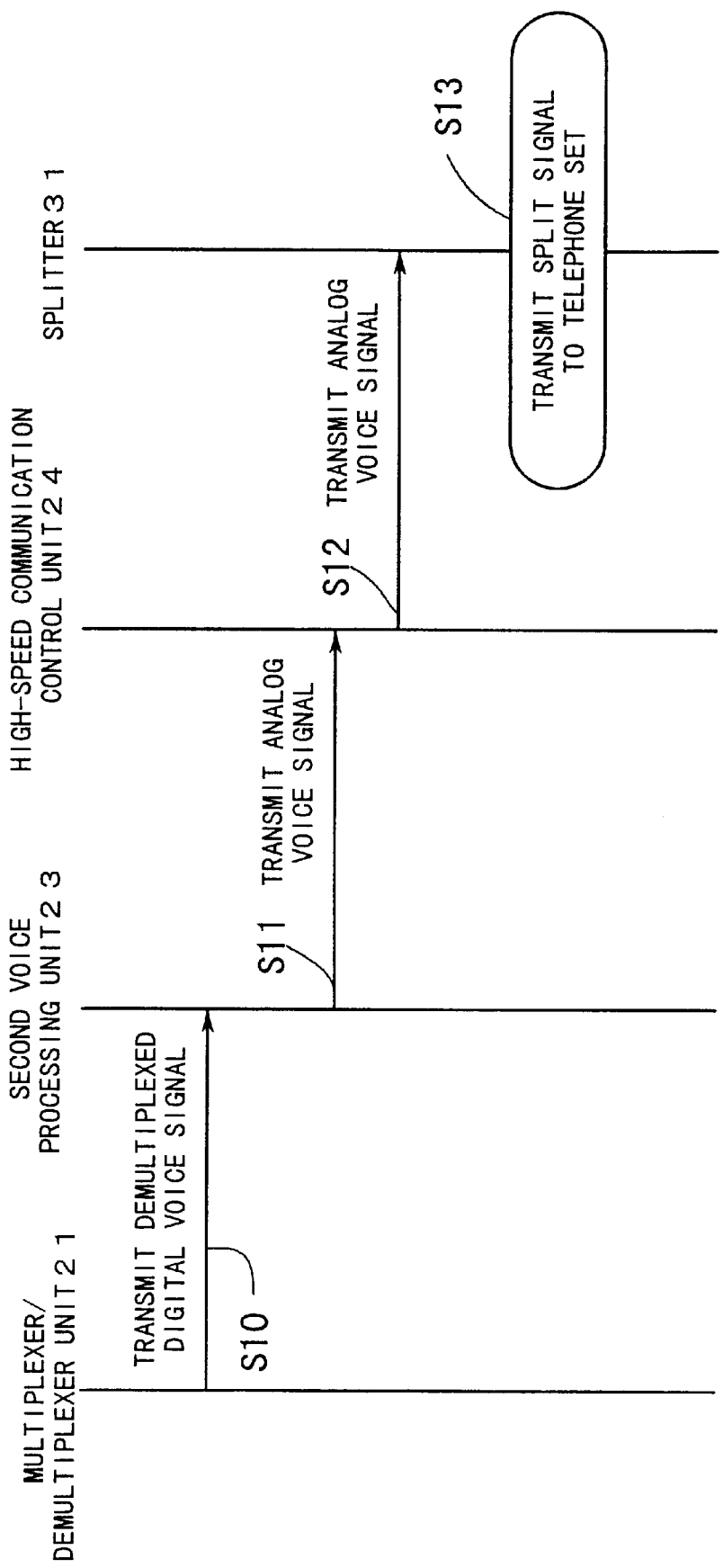
FIG. 4 is a sequence diagram which shows a process of transmitting voice signals to a voice/data service subscriber.
Figure 5:
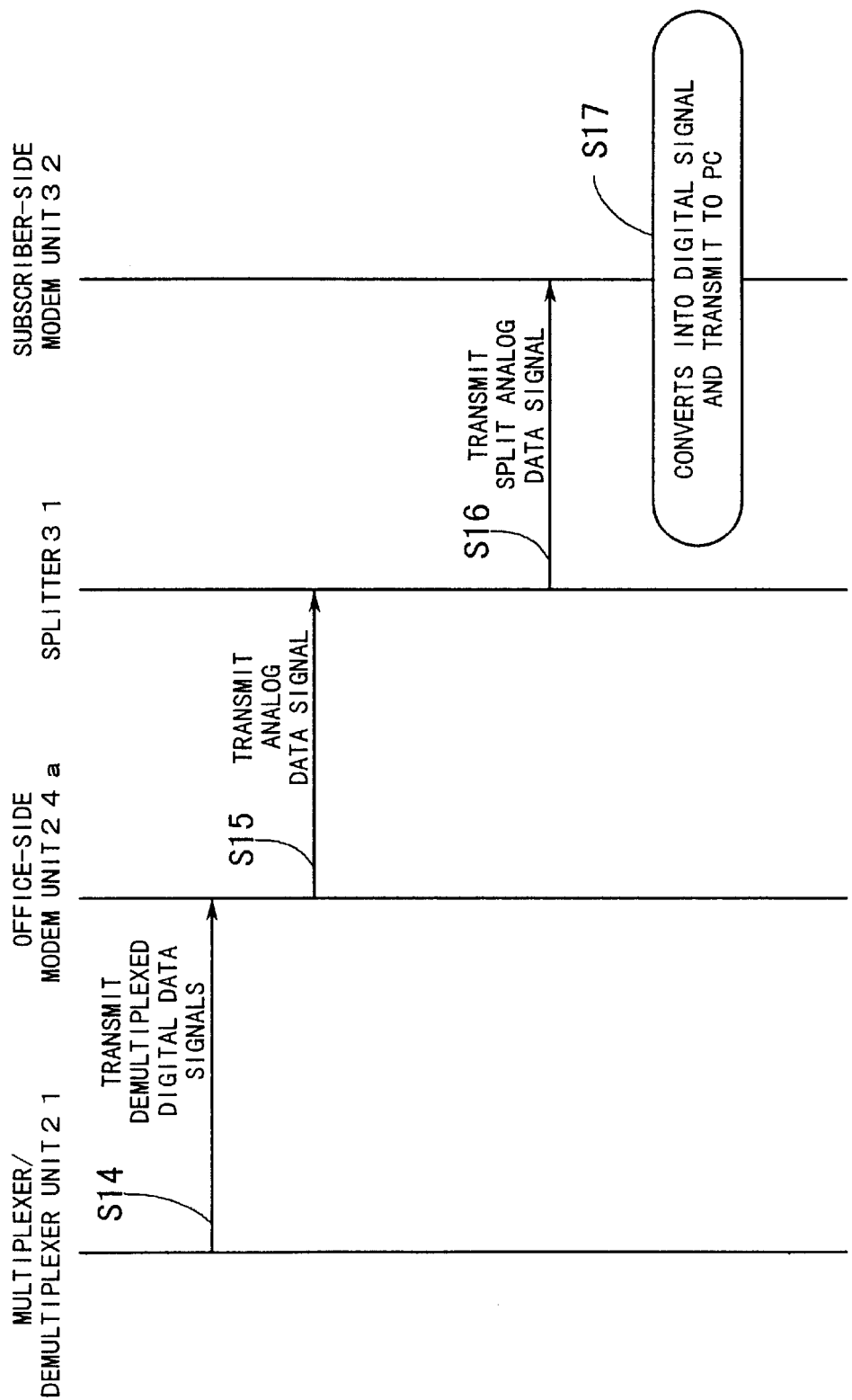
FIG. 5 is a sequence diagram which shows a process of transmitting data signals to a voice/data service subscriber.

Referring next to FIGS. 4 and 5, the following section will describe the signal traffic particularly in a downstream signal transmission from the central office 2 to the voice/data service subscriber 3.

FIG. 4 is a sequence diagram which shows a process of transmitting voice signals to the voice/data service subscriber 3.

(S10) The multiplexer/demultiplexer unit 21 receives a digital bitstream from the voice communications network 5 through the local switching system. Here, a particular voice signal is extracted (or demultiplexed) from the received digital bitstream, based on its identifier that can be found in the signal. The multiplexer/demultiplexer unit 21 feeds the extracted voice signal to the second voice processor 23. Here, the identifier is a piece of messaging information that indicates to which subscriber the signal is addressed. The multiplexer/demultiplexer unit 21 uses this identifier information to extract voice signals addressed to different subscribers.

(S11) The second voice processing unit 23 converts the extracted digital voice signal into an analog voice signal and passes it to the high-speed communication control unit 24.

(S12) The high-speed communication control unit 24 transmits the analog voice signal toward the subscriber-side splitter 31 via its local splitter 24b.

(S13) The splitter 31 extracts the analog voice signal and feeds it to the subscriber's telephone set.

FIG. 5 is a sequence diagram which shows a process of transmitting data signals to the voice/data service subscriber 3.

(S14) The multiplexer/demultiplexer unit 21 receives a digital bitstream from the data communications network 6. A particular data signal is extracted (or demultiplexed) out of the received digital bitstream, based on its identifier that can be found in the received bitstream. The multiplexer/demultiplexer unit 21 feeds the extracted digital data signal to the office-side modem unit 24a.

(S15) The office-side modem unit 24a then converts the digital data signal into an analog data signal and transmits it to the subscriber-side splitter 31 via its local splitter 24b.

(S16) The splitter 31 extracts the analog data signal and feeds it to the subscriber-side modem unit, 32.

(S17) The subscriber-side modem unit 32 then converts the analog data signal into a digital data signal and transmits it to the personal computer.

Figure 6:
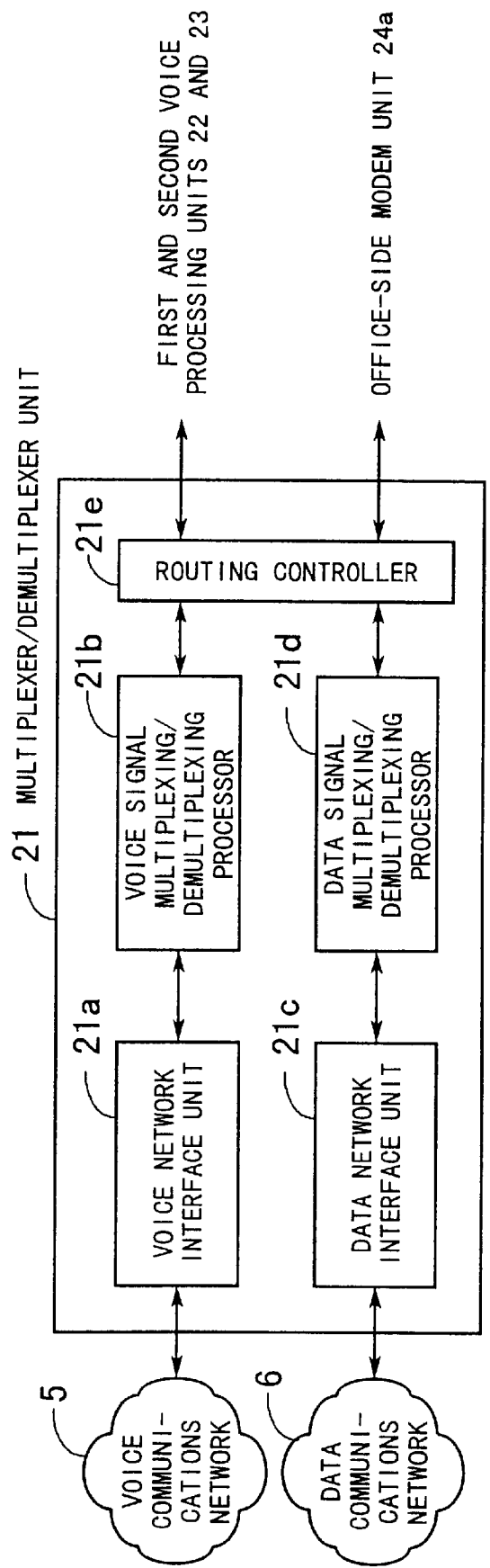
FIG. 6 is a diagram which shows the structure of a multiplexer/demultiplexer unit.

Referring next to FIG. 6, the following section will describe the multiplexer/demultiplexer unit 21. FIG. 6 illustrates the internal structure of the multiplexer/demultiplexer unit 21. Note that the routing controller 21e is implemented as integral part of the multiplexer/demultiplexer unit 21.

The multiplexer/demultiplexer unit 21 further comprises several functional units described below. A voice network interface unit 21a controls the transmission and reception of digital voice signals to/from the voice communications network 5. A voice signal multiplexing/demultiplexing processor 21b multiplexes digital voice signals supplied from the first and second voice processing units 22 and 23. It also demultiplexes digital voice signals received from the voice communications network 5 via the voice network interface unit 21a. A data network interface unit 21c controls the transmission and reception of digital data signals to/from the data communications network 6. A data signal multiplexing/demultiplexing processor 21d multiplexes digital data signals supplied from a plurality of office-side modem units 24a. It also demultiplexes digital data signals received from the data communications network 6 via the data network interface unit 21c.

Figure 7:
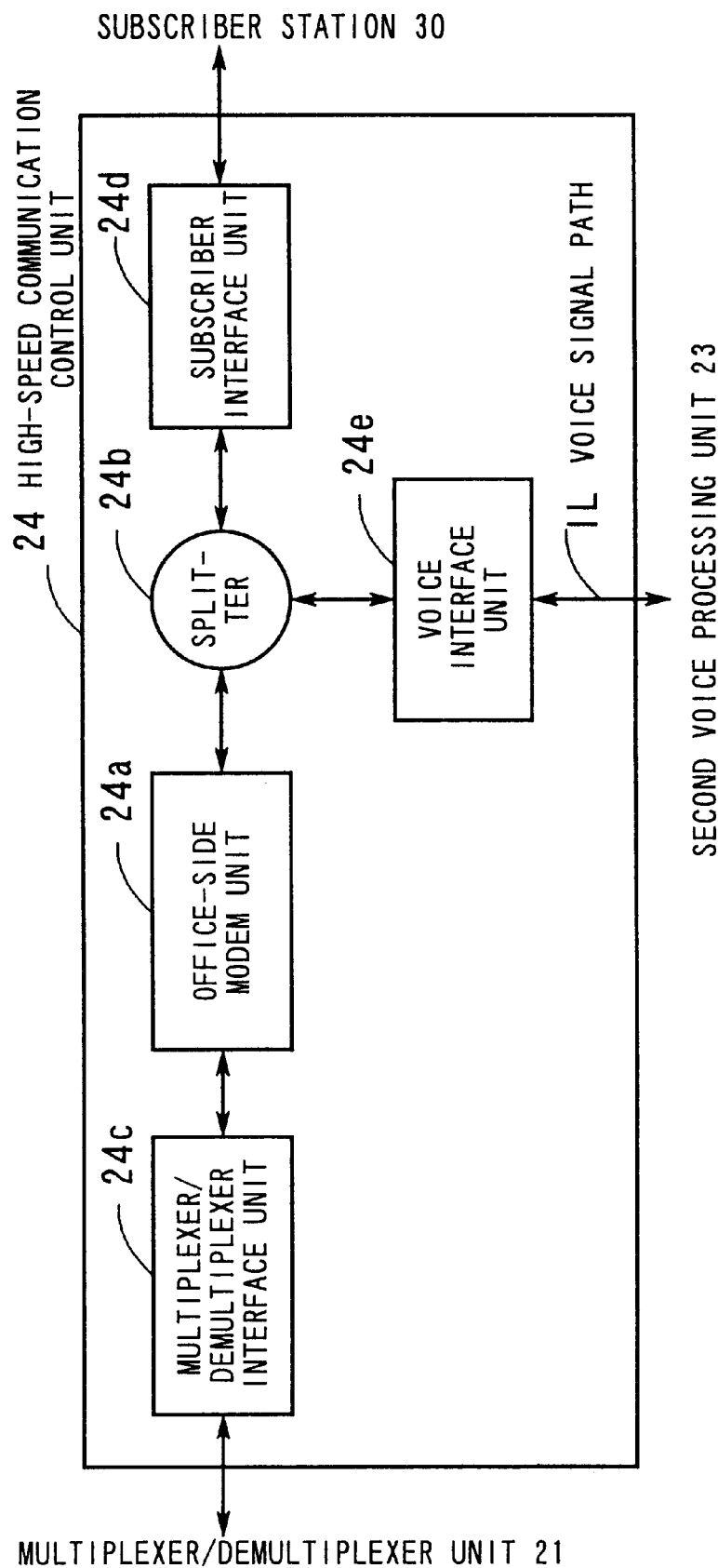
FIG. 7 is a diagram which shows the structure of a high-speed communication control unit.

Referring now to FIG. 7, the next section will describe the high-speed communication control unit 24 in detail.

FIG. 7 shows the internal structure of the high-speed communication control unit 24, which comprises: an office-side modem unit 24a, a splitter 24b, a multiplexer/demultiplexer interface unit 24c, a subscriber interface unit 24d, and a voice interface unit 24e. The multiplexer/demultiplexer interface unit 24c controls the transmission and reception of digital data signals supplied from the multiplexer/demultiplexer unit 21. The office-side modem unit 24a performs digital-to-analog conversion of digital data signals supplied from the multiplexer/demultiplexer unit 21. It also performs analog-to-digital conversion of analog data signals sent from the subscriber station 30.

The splitter 24b transfers analog data signal supplied from the office-side modem unit 24a to the subscriber interface unit 24d. It further supplies the subscriber interface unit 24d with analog voice signals sent from the voice interface unit 24e. In addition, the splitter 24b receives analog voice/data signals from the subscriber station 30 and splits them into separate voice and data signals. The resultant analog voice signals are supplied to the voice interface unit 24e, while the analog data signals are sent to the office-side modem unit 24a.

The subscriber interface unit 24d provides a link to the subscriber station 30. The voice interface unit 24e interfaces with the second voice processing unit 23. To send and receive voice signals to/from the splitter 24b, the second voice processing unit 23 uses a voice signal link IL, which will be described later.

The office-side modem unit 24a is an xDSL modem which enables high-speed voice/data communication over a standard copper-wire subscriber loop. FIG. 8 shows a table 24a-1 which briefly describes possible features of this office-side modem unit 24a. Depending on what kind of xDSL technology is selected, the office-side modem unit 24a may have different performance characteristics. When the subscriber line transmission unit 20 is equipped with a plurality of high-speed communication control units 24, their respective office-side modem units 24a may or may not be the same kind of modems. More specifically, it is possible to configure the office-side modem units 24a with ADSL modems only. It is also allowed to use ADSL modems for some subscribers and VDSL modems for other subscribers.

Figure 9:
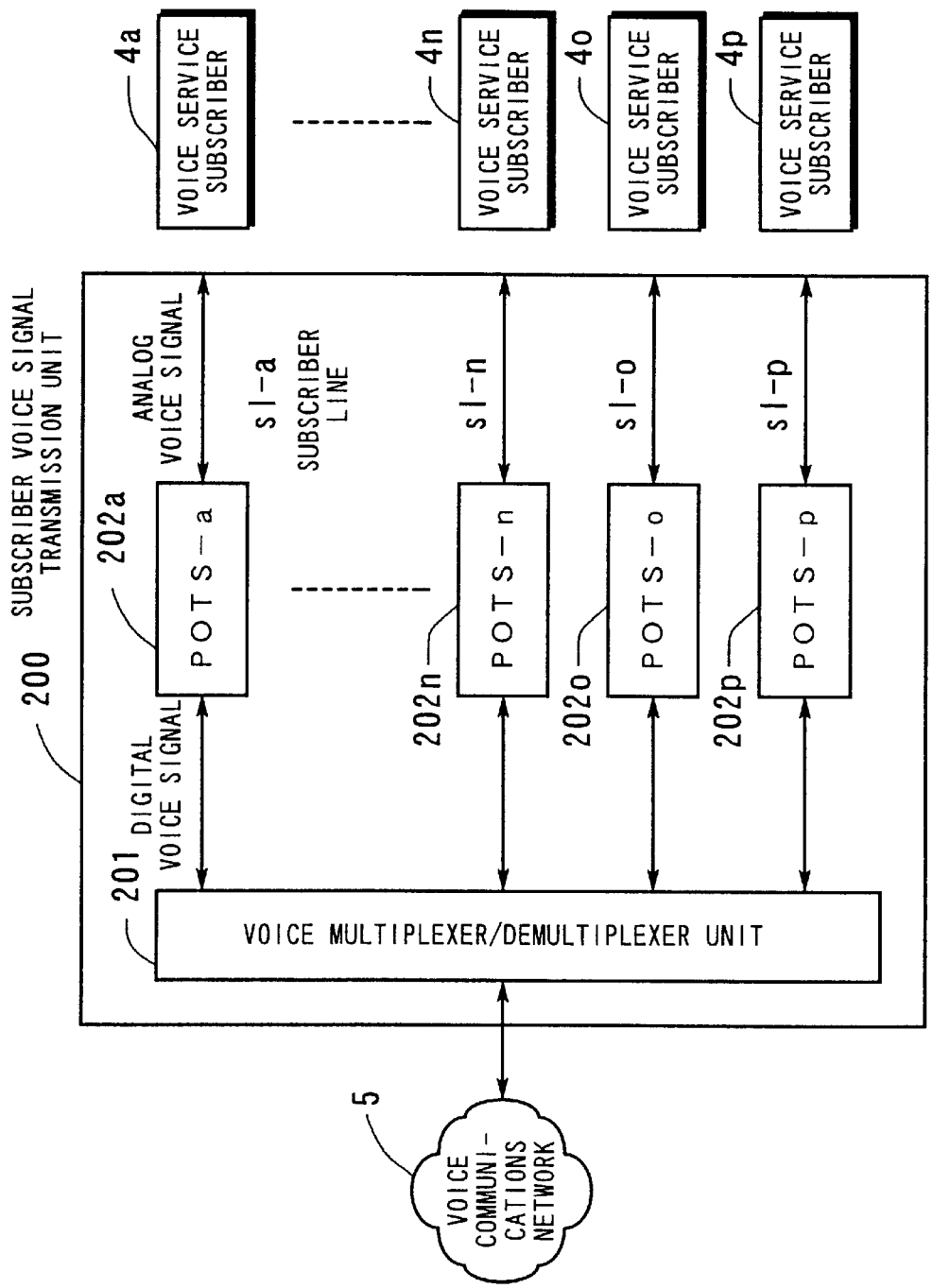
FIG. 9 is a total block diagram of a subscriber voice signal transmission unit which is dedicated to voice communication services.
Figure 10:
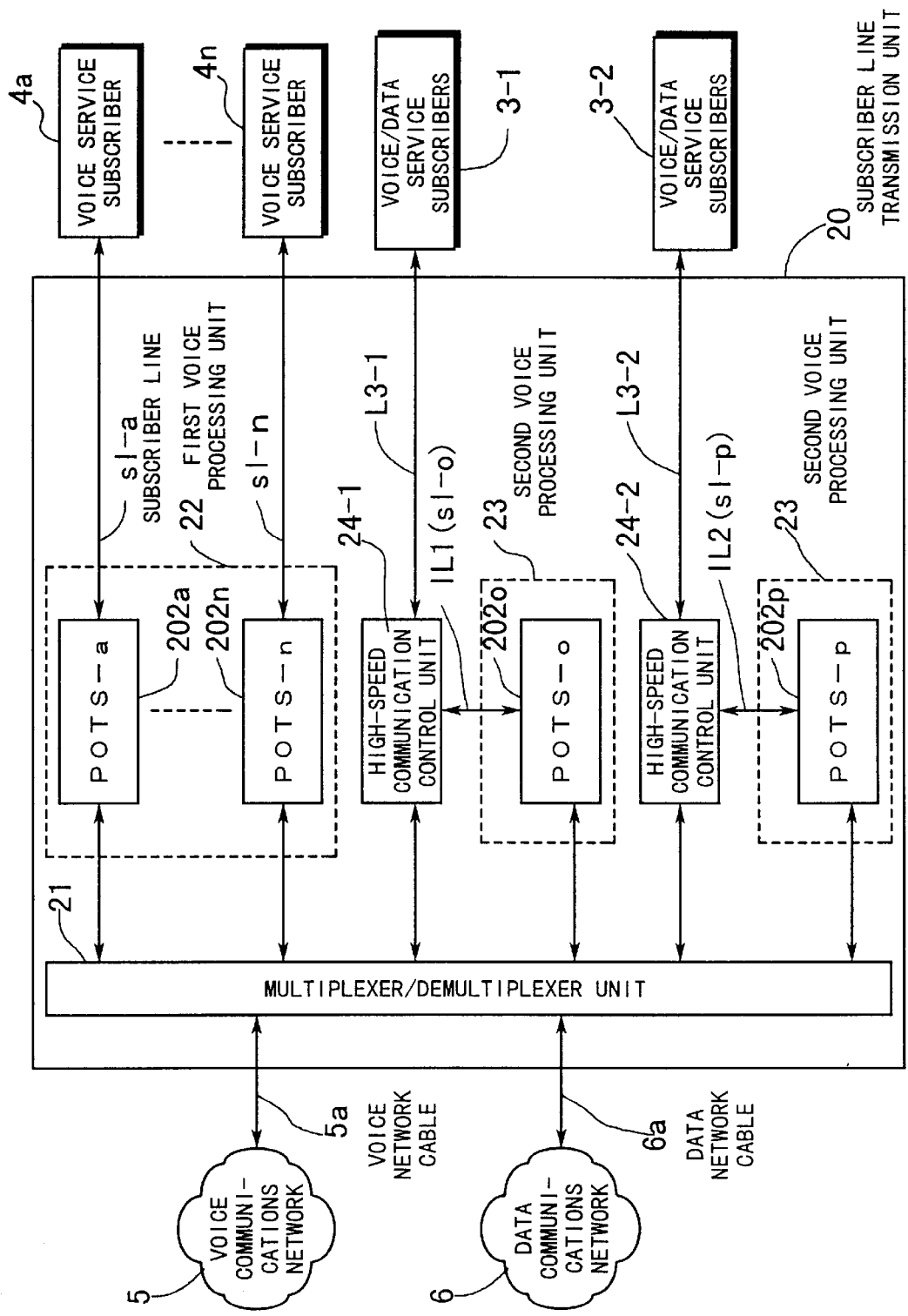
FIG. 10 is a total block diagram of a subscriber line transmission unit of the present invention.

Referring now to FIGS. 9 and 10, the following section will describe how to convert an existing subscriber voice signal transmission unit, which has no xDSL capabilities at present, to a subscriber line transmission unit 20 of the present invention, which offers both voice and data services.

FIG. 9 is a total block diagram of a subscriber voice signal transmission unit 200, which is dedicated to voice communication services. This voice-only transmission unit 200 links the voice communications network 5 with a plurality of voice service subscribers 4a to 4p. It comprises a voice multiplexer/demultiplexer unit 201, which multiplexes digital voice signals before sending out to the voice communications network 5 and demultiplexes digital voice signals received from the voice communications network 5.

The subscriber voice signal transmission unit 200 further comprises a plurality of plain old telephone service (POTS) units 202a to 202p, each corresponding to the first voice processing unit 22 of FIG. 1. Conventional subscriber loops S1-a to S1-p connect those POTS units 202a to 202p with the individual voice service subscribers 4a to 4p, respectively. The POTS units 202a to 202p each convert digital signals supplied from the voice multiplexer/demultiplexer unit 201 into analog signals. The produced analog voice signals are then sent to the voice service subscribers 4a to 4p. Also, the POTS units 202a to 202p each convert analog voice signals received from the voice service subscribers 4a to 4p into digital voice signals, and sends them to the voice multiplexer/demultiplexer unit 201.

FIG. 10 is a total block diagram of the subscriber line transmission unit 20 of the present invention. It is assumed here that the voice service subscribers 4o and 4p shown in FIG. 9 have introduced a subscriber station 30 to use data communication services at their premises. Accordingly, they are now referred to as voice/data service subscribers 3-1 and 3-2 in FIG. 10.

The subscriber line transmission unit 20, being connected to a voice communications network 5 and a data communications network 6, provides voice and/or data communication services to a plurality of voice service subscribers 4a to 4n and two voice/data service subscribers 3-1 and 3-2. While explicitly shown in FIG. 1, the routing controller 21e is not illustrated in FIG. 10.

The multiplexer/demultiplexer unit 21 is linked to the data communications network 6 via a data network cable 6a. It multiplexes and demultiplexes digital data signals transmitted to or received from the network 6.

The POTS units 202a to 202n, each of which corresponds to the first voice processing unit 22, are linked to voice service subscribers 4a to 4n via subscriber loops s1-a to s1-n, respectively. Besides being coupled to the multiplexer/demultiplexer unit 21, high-speed communication control units 24-1 and 24-2 are linked to the voice/data service subscribers 3-1 and 3-2 via newly configured subscriber lines L3-1 and L3-2, respectively.

Further, the high-speed communication control unit 24-1 has a connection to the POTS unit 202o through a voice signal link IL1. This voice signal link IL1 was formerly the subscriber loop s1-o, and it is now connected to a splitter 24b (not shown in FIG. 10) within the high-speed communication control unit 24-1 via a voice interface unit 24e (not shown in FIG. 10). Similarly, the high-speed communication control unit 24-2 is linked to the corresponding POTS unit 202p through a voice signal link IL2, which was formerly the subscriber loop s1-p. This voice signal link is now connected to a splitter 24b (not shown in FIG. 10) within the high-speed communication control unit 24-2 via its voice interface unit 24e (not shown in FIG. 10). Each of the POTS units 202o and 202p serves as the second voice processing unit 23.

In this way, a voice/data service capability is added to the subscriber line transmission unit 20 by: installing high-speed communication control units 24-1 and 24-2 to interface with the voice/data service subscribers 3-1 and 3-2, and then connecting subscriber lines s1-o and s1-p of the existing POTS units 202o and 202p to the newly installed high-speed communication control units 24-1 and 24-2 as their respective voice signal links IL1 and IL2.

Figure 11:
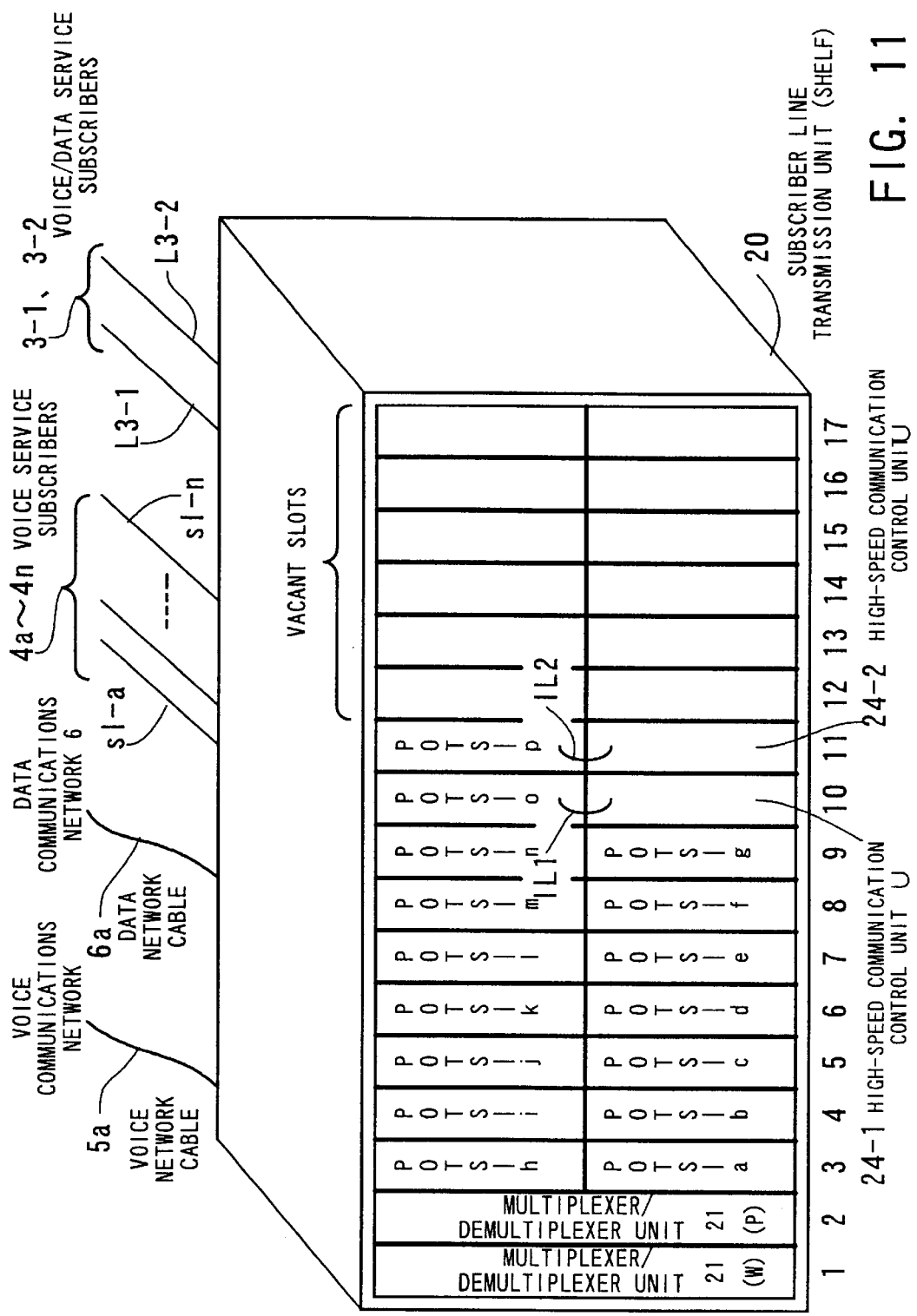
FIG. 11 is a typical external view of a subscriber line transmission unit configured in a shelf.

Referring now to FIG. 11, the following section will describe a typical external view of the subscriber line transmission unit 20.

As FIG. 11 shows, the subscriber line transmission unit 20 is typically configured in a modular structure, where multiple circuit modules are mounted in a shelf. The illustrated shelf of the subscriber line transmission unit 20 has seventeen slots, #1 to #17. Slot #1 is used to hold a multiplexer/demultiplexer unit (W) which is working as a primary unit in a dual redundant configuration. Another multiplexer/demultiplexer unit (P) is installed in slot #2 as a backup (or protect) unit. This dual redundancy design protects the subscriber line transmission unit 20 against any possible failure in one multiplexer/demultiplexer unit 21.

Slots #3 to #17 are each divided into upper and lower halves. FIG. 11 shows that POTS units 202a to 202n (i.e., POTS-a to POTS-n; reference numerals are omitted in FIG. 11) are installed in the upper and lower halves of slots #3 to #9. Slots #10 and #11 accommodate two POTS units 202o and 202p (i.e., POTS-o and POTS-p) in their upper portions. The lower halves of these two slots are used to mount the high-speed communication control units 24-1 (W) and 24-2 (P). Further, a voice signal link IL1 interconnects the POTS unit 202o and high-speed communication control unit 24-1, as does another voice signal link IL2 for the POTS unit 202p and high-speed communication control unit 24-2. While FIG. 11 shows this connection of IL1 and IL2 being made on the front side of the shelf, it may be possible to use backplane connection to obtain the same effect.

The shelf has some connectors on its backplane to link with the voice communications network 5 and data communications network 6 via a voice network cable 5a and a data network cable 6a, respectively. Subscriber links also originate from the backplane, which include: subscriber lines s1-a to s1-n for the voice service subscribers 4a to 4n, and two more subscriber lines L3-1 and L3-2 for the voice/data service subscribers 3-1 and 3-2.

As described above, the high-speed communications system 1 of the present invention is implemented in a central office 2 to enable a high-speed signal transmission to/from a voice/data service subscriber 3. This system comprises: a multiplexer/demultiplexer unit 21 which multiplexes and demultiplexes voice and data signals, and a high-speed communication control unit 24 which supports bidirectional data communication in addition to the splitting of voice and data signals. This configuration permits high-speed communication service capabilities to be added with minimum modification to the existing communications facilities, giving more flexibility to the local carrier's service operations.

Now, the following section will present a method of configuring transmission equipment for communication services. The proposed method assumes a typical voice communications facility, such as a subscriber voice signal transmission unit 200 illustrated in FIG. 9. That is, a dual-redundant voice multiplexer/demultiplexer unit 201 multiplexes and demultiplexes voice signals, and a voice processing units 202a to 202p support bidirectional voice communication. These units are installed in appropriate slots of the subscriber voice signal transmission unit 200. The proposed method makes it possible to add a capability of voice/data communication services to allow an intended subscriber to use voice, data, or both communication services.

This change is what was explained in an earlier section as the upgrade from a subscriber voice signal transmission unit 200 to a subscriber line transmission unit 20. The present invention allows an in-service upgrade; i.e., a new service can be set up and launched while keeping the functionality of existing voice processing units dedicated to voice communication services.

Figure 12:
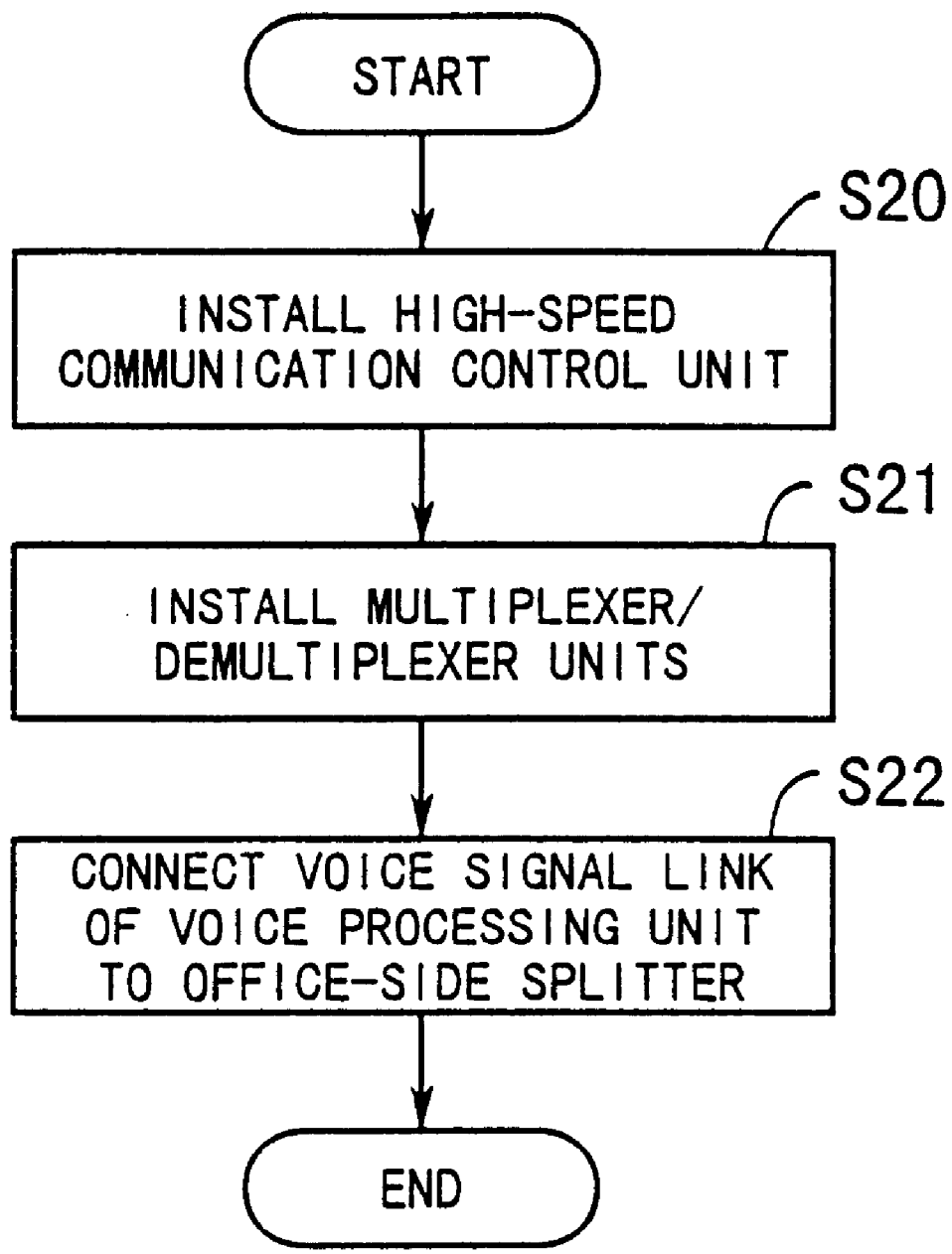
FIG. 12 is a flowchart which shows a process of configuring transmission equipment according to the present invention.

FIG. 12 is a flowchart which shows a process of configuring transmission equipment according to the present invention.

(S20) A high-speed communication control unit 24, which comprises an office-side modem unit 24a and an office-side splitter 24b, is installed into a vacant slot of the subscriber voice signal transmission unit 200. Here, the office-side modem unit 24a provides modulator/demodulator functions to support high-speed bidirectional data communication with a voice/data service subscriber 3. The splitter 24b splits the reception signals into voice signals and data signals during the communication with the voice/data service subscriber 3.

(S21) A multiplexer/demultiplexer unit 21 is installed into a slot that is reserved for backup (protect) purposes. Here, the multiplexer/demultiplexer unit 21 is a unit that multiplexes outgoing signals to the network and demultiplexes incoming signals from the network, separately for voice and data signals. The new multiplexer/demultiplexer unit 21 is activated upon installation, and the voice multiplexer/demultiplexer unit 201 that have been working so far as the primary unit is now deactivated. After that, the deactivated voice multiplexer/demultiplexer unit 201 is replaced with another multiplexer/demultiplexer unit 21. As a result, two multiplexer/demultiplexer units 21 are installed in place of the two (i.e., primary and backup) voice multiplexer/demultiplexer units 201.

(S22) The subscriber line (s1) of the second voice processing unit 23 is connected to the splitter 24b that is newly installed as part of the high-speed communication control unit 24. The former subscriber line (s1) now serves as a voice signal link (IL).

In summary, according to the proposed method, the transmission equipment for voice services can be modified during operation by: (1) installing a multiplexer/demultiplexer units 21 in place of a backup voice multiplexer/demultiplexer unit 201, (2) installing a high-speed communication control unit 24 to a vacant slot, and (3) interconnecting a voice processing unit 23 and the high-speed communication control unit 24 with a voice signal link IL.

The proposed method permits the local carrier to easily upgrade the existing subscriber voice signal transmission unit 200 to start providing their customers with xDSL links, without the need for procurement of whole new equipment. This is accomplished by inserting necessary modules to vacant slots of the subscriber voice signal transmission unit 200 and adding some wiring for them. The cabling for xDSL components can be made with a smaller amount of engineering work in the shelf of the subscriber voice signal transmission unit 200, compared to conventional equipment. This permits the local carrier to switch or enhance their services with new xDSL technologies easily and efficiently.

The above discussion will now be summarized as follows. The high-speed communications system according to the present invention employs a multiplexer/demultiplexer unit and a high-speed communication control unit as part of a subscriber line transmission unit located in a local carrier's central office. The multiplexer/demultiplexer unit multiplexes and demultiplexes voice and data signals, while the high-speed communication control unit supports data signal processing and voice/data separation. This structural arrangement gives more flexibility to local carriers' operations, allowing them to introduce new high-speed data services with only a small amount of work to modify the existing equipment that they own.

Further, the present invention proposes a method of configuring transmission equipment for voice/data communication services. According to the proposed method, an existing facility for voice communication services is upgraded by executing the following steps of: (a) installing a high-speed communication control unit into a vacant slot of the transmission equipment to support high-speed bidirectional data communication for a voice/data service subscriber; (b) installing a multiplexer/demultiplexer unit into a slot that is reserved for a backup voice multiplexer/demultiplexer unit; and (c) connecting a voice signal link of the voice processing unit to an office-side splitter. This gives more flexibility to local carriers' operations, allowing them to introduce new high-speed data services with a small amount of work to modify the existing equipment that they own.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A high-speed communications system which provides high-speed communication services over subscriber lines, comprising:

(a) a subscriber line transmission unit located in a central office, comprising:
  (a1) multiplexer/demultiplexer means for multiplexing outgoing signals to a network and demultiplexing incoming signals from the network, separately for voice signals and data signals,
  (a2) first voice processing means, linked to a voice service subscriber who only uses voice communication services, for processing the voice signals for bidirectional communications over the subscriber line,
  (a3) second voice processing means, linked to a voice/data service subscriber who uses both voice and data communication services, for processing the voice signals for bidirectional communication, and
  (a4) high-speed communications control means comprising:
    (a4-1) office-side modem means for processing the data signals to provide the voice/data service subscriber with bidirectional communication services, and
    (a4-2) office-side splitter means for separating the voice signals and the data signals when providing the voice/data service subscriber with bidirectional communication services;
(b) a subscriber station disposed at a site of the voice/data service subscriber, comprising:
  (b1) subscriber-side splitter means, coupled to said office-side splitter means through the subscriber line, for separating the voice signals and the data signals, and
  (b2) subscriber-side modem means for processing the data signals to provide the voice/data service subscriber with bidirectional communication services,
  wherein said first voice processing means, said second voice processing means, and said high-speed communication control means operate independently of each other in said subscriber line transmission unit.

2. The high-speed communications system according to claim 1, wherein said multiplexer/demultiplexer means comprises:
  a voice signal multiplexer/demultiplexer which multiplexes and demultiplexes the voice signals; and
  a data multiplexer/demultiplexer, being implemented in a single unit together with said voice signal multiplexer/demultiplexer, which multiplexes and demultiplexes the data signals.

3. The high-speed communications system according to claim 1, wherein said processing of the voice and data signals performed by said subscriber line transmission unit includes analog-to-digital conversion and digital-to-analog conversion of the voice and data signals.

4. The high-speed communications system according to claim 1, wherein said subscriber line transmission unit further comprises routing control means for routing the voice signals and data signals transmitted to and from the voice service subscriber and the voice/data service subscriber.

5. The high-speed communications system according to claim 1, wherein said processing of the data signals performed by said subscriber-side modem means includes analog-to-digital conversion and digital-to-analog conversion of the data signals.

6. The high-speed communications system according to claim 1, wherein:
  said subscriber line transmission unit supports xDSL services, and
  said subscriber line transmission unit and said subscriber station communicate with each other at variable data transmission rates.

7. A high-speed communications system which provides high-speed communication services over subscriber lines, comprising:
(a) a subscriber line transmission unit located in a central office, comprising:
  (a1) multiplexer/demultiplexer means for multiplexing outgoing signals to a network and demultiplexing incoming signals from the network, separately for voice signals and data signals,
  (a2) first voice processing means, linked to a voice service subscriber who only uses voice communication services, for processing the voice signals for bidirectional communications over the subscriber line,
  (a3) second voice processing means, linked to a voice/data service subscriber who uses both voice and data communication services, for processing the voice signals for bidirectional communication, and
  (a4) high-speed communications control means comprising:
    (a4-1) office-side modem means for processing the data signals to provide the voice/data service subscriber with bidirectional communication services, and
    (a4-2) office-side splitter means for separating the voice signals and the data signals when providing the voice/data service subscriber with bidirectional communication services;
(b) a subscriber station disposed at a site of the voice/data service subscriber, comprising:
  (b1) subscriber-side splitter means, coupled to said office-side splitter means through the subscriber line, for separating the voice signals and the data signals, and
  (b2) subscriber-side modem means for processing the data signals to provide the voice/data service subscriber with bidirectional communication services,
  said subscriber line transmission unit is configured in a shelf having a plurality of slots,
  said multiplexer/demultiplexer means is implemented as modules installed in the slots with a redundant configuration, and
  said first voice processing means, said high-speed communication control means, and said second voice processing means are each implemented as modules installed in the slots.

8. A high-speed communications system which provides high-speed communication services over subscriber lines, comprising:
(a) a subscriber line transmission unit located in a central office, comprising:
  (a1) multiplexer/demultiplexer means for multiplexing outgoing signals to a network and demultiplexing incoming signals from the network, separately for voice signals and data signals,
  (a2) first voice processing means, linked to a voice service subscriber who only uses voice communication services, for processing the voice signals for bidirectional communications over the subscriber line,
  (a3) second voice processing means, linked to a voice/data service subscriber who uses both voice and data communication services, for processing the voice signals for bidirectional communication, and (a4) high-speed communications control means comprising:
  (a4-1) office-side modem means for processing the data signals to provide the voice/data service subscriber with bidirectional communication services, and
  (a4-2) office-side splitter means for separating the voice signals and the data signals when providing the voice/data service subscriber with bidirectional communication services;
(b) a subscriber station disposed at a site of the voice/data service subscriber, comprising:
  (b1) subscriber-side splitter means, coupled to said office-side splitter means through the subscriber line, for separating the voice signals and the data signals, and
  (b2) subscriber-side modem means for processing the data signals to provide the voice/data service subscriber with bidirectional communication services,
  wherein said subscriber line transmission unit comprises a plurality of said high-speed communication control means being installed in a single shelf, which have different data transmission rates to provide multiple concurrent sessions of high-speed communication services.

9. The high-speed communications system according to claim 1, wherein said first voice processing means is omitted when said subscriber line transmission unit is dedicated to said voice/data service subscriber.

10. A subscriber line transmission unit being located in a central office for providing a subscriber with high-speed communication services over a subscriber line, comprising:
  (a1) multiplexer/demultiplexer means for multiplexing outgoing signals to a network and demultiplexing incoming signals from the network, separately for voice signals and data signals;
  (a2) first voice processing means, linked to a voice service subscriber who only uses voice communication services, for processing the voice signals for bidirectional communications over the subscriber line;
  (a3) second voice processing means, linked to a voice/data service subscriber who uses both voice and data communication services, for processing the voice signals for bidirectional communication; and
  (a4) high-speed communications control means comprising:
    (a4-1) office-side modem means for processing the data signals to provide the voice/data service subscriber with bidirectional communication services, and
    (a4-2) office-side splitter means for separating the voice signals and the data signals when providing the voice/data service subscriber with bidirectional communication services,
  wherein said first voice processing means, said second voice processing means, and said high-speed communication control means operate independently of each other in said subscriber line transmission unit.

11. A method of configuring a subscriber line transmission unit in order to add a voice/data communication service capability for a requesting subscriber, said subscriber line transmission unit having slots to install two voice multiplexer/demultiplexer units, one for active use and the other for backup, to provide dual redundancy functions for multiplexing and demultiplexing voice signals, as well as to install a plurality of voice processing units which process the voice signals to provide voice communication services, said method comprising the steps of:
  (a) providing a high-speed communication control unit having an office-side modem unit which provides modulator/demodulator/functions to support high-speed bidirectional data communication for the requesting subscriber and an office-side splitter which splits incoming signals received from the subscriber into separate voice and data signals;
  (b) providing a multiplexer/demultiplexer unit which multiplexes outgoing signals to a network and demultiplexer incoming signals from the network separately for voice signals and data signals;
  (c) installing the high-speed communication control unit into a vacant slot of the subscriber line transmission unit;
  (d) installing the multiplexer/demultiplexer unit into a slot that is reserved for the backup voice multiplexer/demultiplexer unit;
  (e) switching the multiplexing and demultiplexing functions from the active voice multiplexer/demultiplexer unit to the multiplexer/demultiplexer unit newly installed at said step (d); and
  (f) connecting a subscriber line from the requesting subscriber's voice processing unit to the office side splitter of the high-speed communication control unit installed at said step (c), thereby establishing a voice signal link.

12. The method according to claim 11, wherein said steps (a) to (c) are executed while the voice processing unit is in operation.

\* \* \* \* \*